Sept. 12, 1933.  F. W. MURRAY  1,926,956
TRANSMISSION DEVICE
Original Filed July 2, 1925   3 Sheets-Sheet 1

Inventor
Frederick W. Murray
By Walter W. Burns
Attorney

Sept. 12, 1933.     F. W. MURRAY     1,926,956
TRANSMISSION DEVICE
Original Filed July 2, 1925     3 Sheets-Sheet 3

Patented Sept. 12, 1933

1,926,956

UNITED STATES PATENT OFFICE 1,926,956

TRANSMISSION DEVICE

Frederick W. Murray, Atlantic City, N. J.

Application July 2, 1925, Serial No. 41,192
Renewed February 6, 1933

44 Claims. (Cl. 192—59)

This invention relates to power transmission devices and particularly to those devices intended to transmit power at varying speed ratios from one shaft to another, the axes of the shafts being in the same line.

The primary object of my invention is the provision of an improved power transmission device for transmitting power between substantially coaxial rotating members at varying speed ratios.

Another object of my invention is the provision of a transmission device having a fluid system including high and low pressure portions, the high pressure portion including variable capacity chambers, the low pressure portion comprising a space for collecting the leakage from the high pressure chamber and connections to return the same to the high pressure portion.

Still another object of my invention is the provision of an improved power transmission device having an axially reciprocating fluid piston operating in a cylinder and means for retaining in the system the fluid which leaks from the cylinder.

A still further object of my invention is the provision of an improved power transmission device having an axially reciprocating fluid piston operating in a cylinder and connections for conducting the oil which leaks from one end of the cylinder, over to the other end thereof.

Another and still further object of my invention is the provision of an improved power transmission device for transmitting power between substantially coaxial rotating members, as shafts, at varying speed ratios, having a cylinder and piston relatively reciprocating and having their axes extending in the same direction as the axes of the rotating members, means surrounding the piston, a packing revolving with one of the rotating members and relatively to the other rotating member and means for preventing the pressure of the cylinder from reaching the packing.

Another and still further object of my invention is the provision of such a power transmission device having a leakage receiving chamber and a conduit to conduct the fluid back to the cylinder and having a check means for preventing movement in an opposite direction.

Another and still further object of my invention is the provision of such a power transmission device having a pressure chamber in the cylinder at each side of the piston, a controlled fluid passage between the two chambers, a pressure receiving wall at each end of the cylinder having a predetermined leak, a chamber on the other side of the wall to receive the leakage and a conduit connecting each leakage chamber with the cylinder chamber not under pressure.

Another and still further object of my invention is the provision of a fluid controlled power transmission mechanism for transmitting power with variable speed ratios between coaxial rotating members, as shafts, and having a releasing means for causing the release of one rotating member when the torque between the two rotating members becomes excessive of a predetermined amount.

Another and still further object of my invention is the provision of a suitable reservoir and automatic filling connections for a fluid controlled power transmitting device which transmits power with variable speed ratios between coaxial rotating members such as shafts.

Referring to the drawings wherein I have illustrated a preferred embodiment of my invention.

Figure 1:
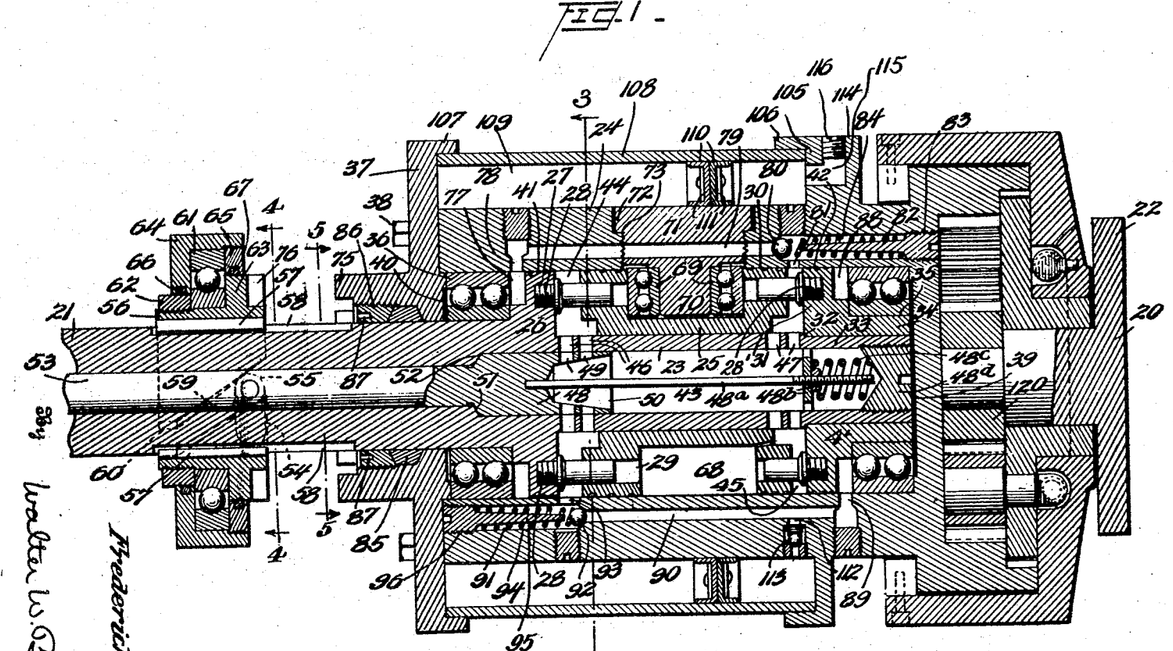
Fig. 1 is a vertical longitudinal view of my invention illustrating the details of construction of the piston, cylinder and parts which cooperate to transmit power at variable speed ratios between the rotating elements.

Similar reference characters refer to the same or similar parts throughout the specification. Referring particularly to Fig. 1 the numeral 20 designates a rotating member which when my invention is installed in an automobile, would be attached to the fly wheel of the gasoline or other suitable automobile motor. The rotation of this member 20 is transmitted through suitable gearing and other connections to mechanism which will transmit power in varying speed ratios to a second rotatable member which I have shown in the shape of the shaft 21.

In transmission devices for automobiles it has been found that the usual type of gear shift mechanism has many disadvantages in that only a limited number of speed ratios between the motor crank shaft and the drive shaft at the rear of the transmission, is obtainable. I will now describe in detail the structure shown in the illustrated embodiment whereby an infinite number of speed ratios may be obtained varying between a substantially 1—1 ratio when the two rotating members 20 and 21 are rotating substantially at the same speed, to a maximum ratio wherein the speed of the rotating member 20 is very much greater than the speed of the rotating member 21. The value of this maximum ratio depends upon proportions of the elements of construction and may be varied with the conditions to be met in actual practice. The rotating member 20 is provided with a flange 22 which may be connected to the fly wheel of the motor in any suitable manner. The rotating member 21, which in an automobile would be the rear rotating member of my improved transmission, is provided with an extension portion 23 which extends within an enclosing member 24 which is revolved by the rotating member 20. Mounted upon the forwardly extending portion 23 is a piston 25 which has an interior opening of sufficient size to move in an axial direction on the extension 23 without binding thereon and without having an undue amount of clearance. Between the main body of the rotating member 21 and its forward extension 23 is a pressure bearing portion which in the present embodiment is shown as being a part of the rotating member 21. This pressure bearing portion is designated by the numeral 26. This pressure bearing portion which in the present embodiment takes the form of a flange, is provided with a threaded series of openings 27 extending throughout the circumference of the flange 26. In these openings 27 are threaded pins 28 which extend in a forward direction and, into openings 29 in the piston 25. It will be observed from this construction that while the piston 25 may be moved axially relative to the extension 23 that any rotation of the piston will mean a corresponding rotation therewith of the flange 26 and consequently the extension 23 and the rotating member 21.

Within the enclosing member 24 is a cylindrical surface 30 which is of a sufficient size to just clear the cylindrical surface of the piston 25. It will be understood, of course, that the outer cylindrical surface of the piston 25 and the cylindrical surface 30 are concentric. On the opposite side of piston 25 from the pressure receiving flange 26 is a detachable pressure receiving flange 31, which fits a shoulder 32 on a smaller extension 33 of the rotating member 21.

Extending outward from the main body of the flange 31 is a bearing receiving portion 34 between which and one end of the cylindrical surface 30 is located a bearing 35. In the present embodiment this bearing 35 is a combined journal-thrust bearing and comprises an outer annular member having a bearing surface, an inner annular member having a bearing surface and anti-friction rolling members therebetween.

Supporting the rotating member 21 adjacent the pressure receiving flange 26 is another bearing member 36 which is similar in construction to the bearing member 35. It will be observed that the thrust of the rotating member 21 and its extensions 23 and 33 are taken up by the bearings 35 and 36, the thrust to the right in Fig. 1 being taken up by the bearing 35 and the thrust to the left being taken up by the bearing 36. The bearing 35 is held against movement by the wall at the end of the cylinder 30. The thrust on the outer member of the bearing 36 is taken up by a flange member 37 which is suitably held by the bolts 38 which extend into the enclosing member 24. It will be observed that the inner member of the bearing 35 does not contact with the wall at the end of the cylinder 30 for the reason that this portion has been cut away as shown on Fig. 1 at 39. The flange member 37 is likewise cut away at 40 to permit clearance of the inner annular member of the bearing 36. The peripheral surface of the flange 26 which I have designated by the numeral 41 is of a diameter to just clear the surface of the cylinder 30, as illustrated in the present embodiment. The same is true of the outer peripheral surface 42 of the flange member 31.

In the present embodiment, the peripheral surfaces 41 and 42 and the peripheral surface of the piston 25 are preferably constructed so that they barely clear the wall of the cylinder and provide a predetermined leak. It is to be understood, however, that if found to be desirable under certain conditions any of the well known devices for preventing leakage between cylindrical surfaces may be employed.

If found to be desirable, the flange member 31 may be provided with any suitable means to prevent its turning on the extension 33 and may also be provided with pins 28' similar to the pins 28 and extending into the piston 25.

The extension 23 of the rotating member 21 is provided with a conduit 43 which extends from a point beyond one end of the piston 25 to a point beyond the other end of the same. At the ends of the piston 25 when the same is in mid-position, are chambers which I have designated as 44 and 45. These chambers 44 and 45 are connected to the conduit 43 by suitable ports 46 and 47. In order to provide a connection having a large cross sectional area between the chamber 44 and the conduit 43 and also between the chamber 45 and the conduit 43, the ports 46 and 47 are provided in suitable numbers and extend preferably throughout the circumference of the extension 23.

As it is intended to use a suitable fluid in this transmission mechanism and in view of the fact that the transmission of power in this device depends upon the retardation of the fluid flow from the chambers at the respective ends of the piston, it is necessary to provide a means for controlling such fluid flow. In the embodiment herein illustrated, a valve 48 is provided with openings 49 which correspond to and register with the ports 46. The inner end of this valve 48 is provided with a bored opening 50 which connects with the conduit 43 and the ports 49. The outer end of the valve 48 is provided with a shoulder which is preferably conical as shown at 51 in Fig. 1. This conical surface coacts with a similar shaped surface 52 there being a ground joint between the two to prevent leakage. The valve 48 is provided with a stem 53 which extends in an opening in the rotating member 21 and is provided at its outer end with a means for turning the valve stem to effect an opening and closing of the openings 49 and ports 46.

The valve 48 is held to its seat by a rod 48$^a$ upon which is a lock nut 48$^b$, which nut is spring pressed by the spring 48$^c$. The spring 48$^c$ is supported at its outer end by the plug 48$^d$ which is threaded into and closes the end of the conduit 43.

The rotating member 21 is provided with an elongated opening 54 to provide for the movement of a pin 55 which is suitably secured to the valve stem 53 of the valve 48. The opening 54 and pin 55 and the openings 49 are so arranged relative to each other that the stem 53 of the valve 48 may be turned angularly without giving any axial movement thereto, in a manner to cause the openings 49 and the ports 46 to come in and out of registration with each other depending upon the direction of movements of the pin 55.

In order to move the pin 55 I have provided a means mounted about the rotating member 21 whereby when the same is given axial movement, rotary movement will be given to the stem 53 through the pin 55 thereby rotating the valve 48. The present embodiment shows a slidable sleeve 56 which is keyed to the rotating member 21 as by the keys 57 the latter sliding in the keyways 58 and being held rigid relative to the slidable sleeve 56. On one side of the cylindrical surface which engages the rotating member 21 I have provided a cam slot 59 which is inclined throughout the greater portion of its length but which extends as at 60 in a direction parallel to the axis of the rotating member 21, for purposes to be presently described.

During operation the rotating member 21 and consequently the slidable sleeve 56 will, of course, be constantly rotating. In order to provide a suitable means for the operation of the slidable sleeve 56 I provide a bearing 61 comprising an outer annular member, an inner annular member and a series of anti-friction devices therebetween. Holding the bearing secure in the sleeve 56 is a threaded locking ring 62 which securely holds the inner bearing member between itself and a flange 63. The outer annular bearing member is securely held in a housing which comprises two parts 64 and 65 which are suitably threaded together as illustrated in Fig. 1. To prevent the entry of dust and other foreign material to this bearing, I provide suitable felt dust rings 66 and 67 in grooves respectively in the housing member 64 and part 65. It will thus be clear that the housing 64 may be gripped tightly by any suitable shifting lever mechanism and the slidable sleeve 56 moved axially while the same is rotating within the housing so held.

Returning to the piston, it will be observed that a large groove 68 has been provided. This groove is in the shape of a cam and of a sufficient width and depth to receive a bearing 69 which comprises an outer annular bearing member engaging the side walls of the groove 68, an inner bearing member and intermediate anti-friction roller members. The inner bearing member of the bearing 69 engages a drive stud 70 which forms a part of a body portion 71 which is suitably threaded into the side of the enclosing member 24. In order to hold this body portion 71 rigidly in place, a flange 72 is provided to engage a suitable shoulder in the opening 73 in which the body portion 71 and the driving stud 70 are inserted.

From the above described construction it will be clear that the rotation of the rotating member 20 transmitted to the enclosing member 24 will cause the driving stud 70 to rotate relative to the piston 25. Because of the shape of the cam groove 68, the piston, if it does not rotate with the stud 70, will be caused to reciprocate on the pins 28 and 28' and along the extension 23. This action, if the chamber 44 and the chamber 45 are filled with fluid, will cause the fluid to pass from the chamber 44 or 45 into the conduit 43, depending upon the direction of travel of the piston in its axial movement. It will also be clear that if the fluid is prevented from escaping from either the chamber 44 or the chamber 45 when the piston tends to cause such escape, there will be a tendency of the rotary movement of the driving stud to be thereby transmitted through the piston, the pins 28 and 28', the flanges 26 and 31 and the rotating member 21 to cause all of these members to rotate.

In order to bring about this retardation, the valve 48 may be closed wholly or in part as already described. After the valve 48 becomes wholly closed, the ratio of movement between the rotating members 22 and 21 will approach unity. Due, however, to the fact that there will be leakage past the flange member 26 and the flange member 31, the speed ratio of the two rotating members will never absolutely reach unity. To provide for the release from operation of the fluid control means during times when it is desired to have the rotating members revolve at the same speed there may be provided suitable positively engaging means between the two rotating members. To bring this result about in the present modification, I have provided a series of teeth 75 on the member 37 in position to engage a similar series of teeth 76 on the sliding sleeve 56. The pin 55 during its travel along the cam slot 59 closes the valve 48 at the junction of the portion 60 which is an extension of the cam slot 59. The slot portion 60 has its side in a plane which is parallel to the axis of the stem 53. This portion of the slot, therefore, does not change the position of the valve 48. During the latter part of the movement of the sliding sleeve 56 while the teeth 75 and 76 are becoming engaged, there is no movement transmitted to the valve 48. It will thus be clear that after the teeth 75 and 76 become engaged, the pressure in the pressure control means will be released and no work will be performed by any of the elements of the fluid control means until such time as the teeth 75 and 76 become disengaged from each other.

In order to take care of the fluid which may leak past the outer cylindrical surface of the wall flange 26, I provide a chamber 77 which includes the space surrounding the bearing 36. Connected to this chamber 77 is a port 78 and a duct 79 which latter leads to a valve seat upon which is a ball valve 80. This ball valve 80 is connected by a duct 81 which opens into the chamber 45 already described. This ball valve is inserted in an opening in which is placed a spindle 82 which is threaded into an opening as at 83 which spindle has upon its inner end an extension to a point adjacent the ball valve 80. Surrounding this spindle is a spring 84 which normally holds the ball valve 80 against its seat and prevents the passage of oil from the chamber in which the spring 84 is located, backwardly into the duct 79.

On the periphery of the opening in the flange member 37 I provide a suitable packing which consists of the packing member 85 and the adjustable follower 86, this latter member being threaded in the flange member 37. The outer end of this follower is split and set screws are provided as shown at 87 to provide for locking the threads of the follower 86 to its threads within the flange member 37.

From the above description it will be clear that the fluid which leaks past the outer circumferential surface 41 of the wall flange member 26 will be collected in the chamber 77 and will, at low pressure, be conducted through the port 78, the duct 79 past the valve 80 into the chamber 45 at the opposite end of the cylinder. It will be understood that when the piston 25 is moving to the left in Fig. 2, this fluid which has leaked past the surface 41 is free to return to the opposite side of the piston due to the fact that there is no pressure within the chamber 45 due to the movement of the piston to the left in Fig. 2.

Since the fluid in the chamber 77 is at a very low pressure, it will be clear that the packing 85 which revolves with the enclosing member 24 does not have to hold very much pressure and is consequently effective to hold the fluid within the system and prevent the fluid control device from becoming ineffective due to leakage. At the right of the flange member 31 is illustrated a chamber 88 in which is located the bearing member 35. This chamber is connected by a port 89 which opens into a duct 90, the opposite end of which connects to a chamber 91 in which is located the ball valve 92. Connecting the chamber 91 with the chamber 44 at the left side of the piston 25, as seen in Fig. 1, is a port 93. The ball 92 is pressed against its seat by the spring 94, the ball valve 92 being limited in its movement by a spindle 95 which is provided with a screw threaded portion 96 threaded into the end of the chamber 91. Since the fluid leaking past the surface 42 of the flange member 31 has to overcome only the pressure of the spring 94, it will be clear that the same low pressure will always be in the chamber 88 as has already been described for the chamber 77.

From the above description, it will be clear that the pressure in the chamber 44 with the piston 25 moving toward the left, as seen in Fig. 1, will equal the pressure in the chamber 45 when the piston is moving to the right, as seen in Fig. 1, the other conditions being the same. It will also be clear that the leakage past the surface 41 of the pressure wall 26 will be received by a low pressure chamber having a connection to the opposite end of the cylinder which thereby retains the oil in the system. This feature possesses a distinct advantage over structures in the art where the packing connecting the outside of the device was made to receive the full pressure of the fluid therein.

Figure 2:
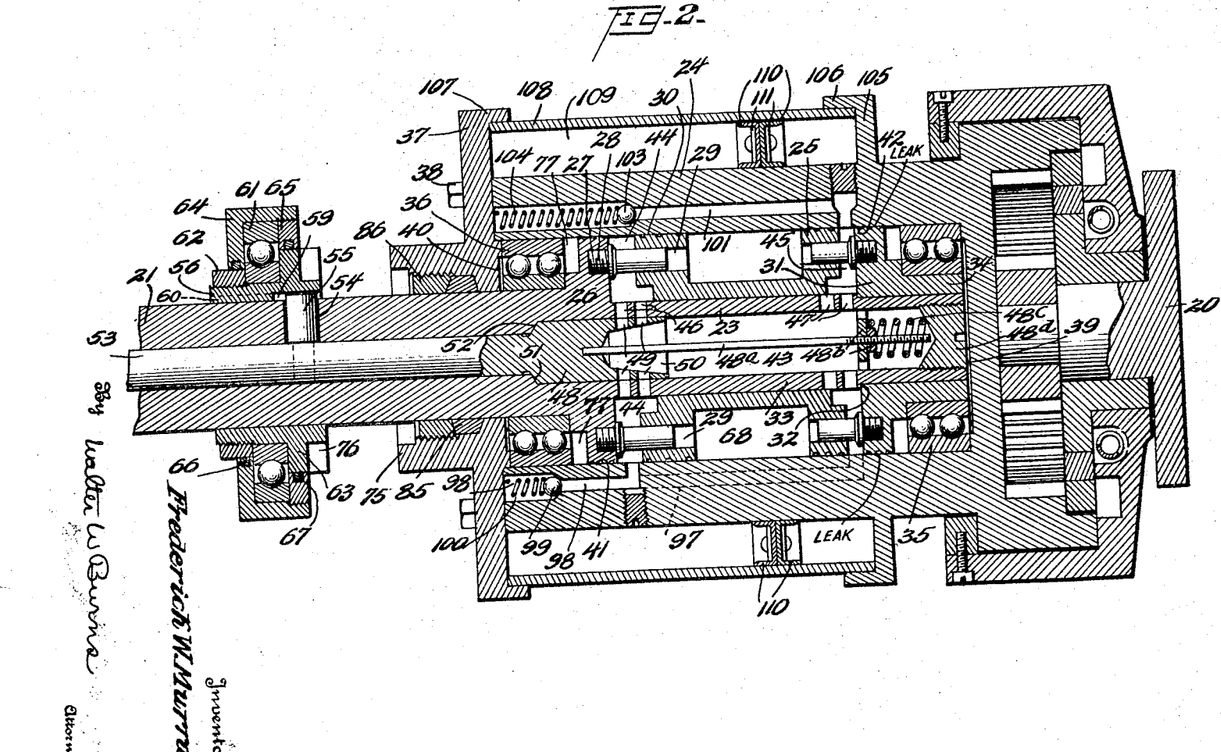
Fig. 2 is a longitudinal sectional view taken at 90° from the section of Fig. 1 showing the releasing connections.
Figures 3, 4:
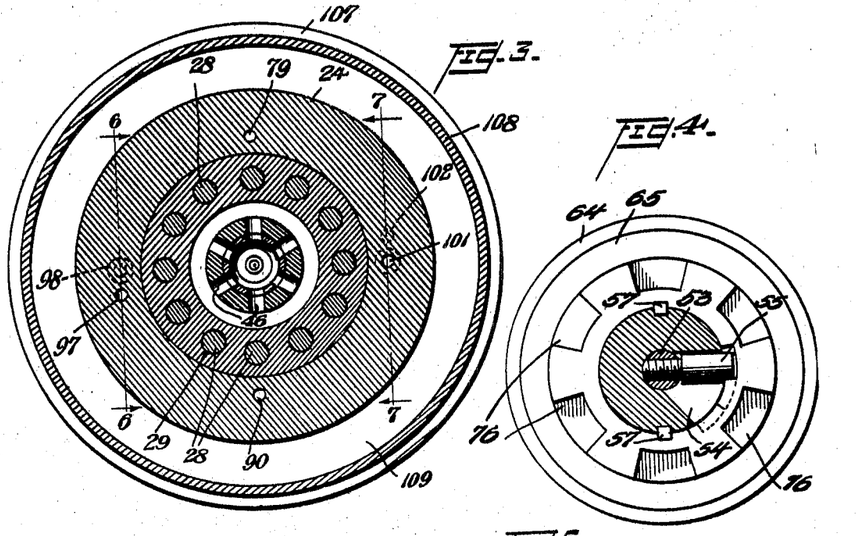
Fig. 3 is a cross sectional view on the line 3—3 of Fig. 1.
Fig. 4 is a cross sectional view on the line 4—4 of Fig. 1.
Figure 5:
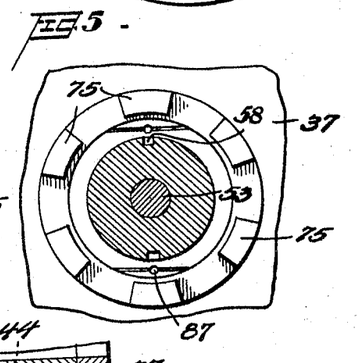
Fig. 5 is a cross sectional view on the line 5—5 of Fig. 1.
Figure 6:
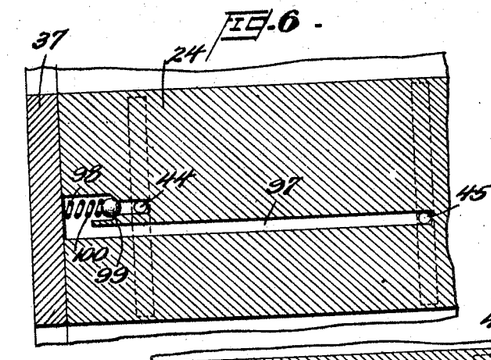
Fig. 6 is a cross sectional view on the line 6—6 of Fig. 3.
Figure 7:
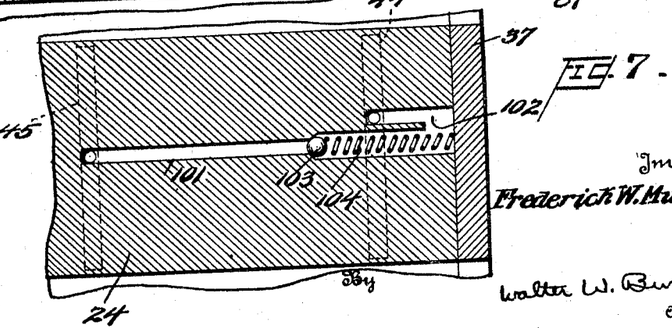
Fig. 7 is a cross sectional view on the line 7—7 of Fig. 3.

In the use of transmissions it is found that at times a driven member may suddenly become, by an overwhelming force, either stopped or nearly stopped. If this occurs and there is not some provision made for taking care of the necessary increased stresses brought about by such conditions, the weakest part of the device or mechanism will become broken. In order to take care of this condition, I have illustrated in the present embodiment in Figs. 2, 6 and 7, a means for releasing the pressure in the chambers 44 and 45, respectively. This construction comprises two conduits connecting the cylinder chambers together, one conduit being for the release of one chamber and the other for the opposite chamber. These two conduits are provided with valves which release in one direction only and at a predetermined fluid pressure. Referring particularly to Figs. 2, 6 and 7, it will be observed that four holes are bored in the end of the enclosing member 24 adjacent the cylinder 30. A duct connecting the chamber 45 at one end affords communication between the chamber 45 and the hole or duct 97 which at its other end is connected at one side to another duct 98. This latter duct is connected through a valve seat upon which rests the valve 99, with the chamber 44. A spring 100 of suitable strength is provided to press the ball valve 99 upon its seat. This spring 100 rests at its end opposite the valve against the wall of the flange member 37 which flange member operates to close the end of the duct 97 and also the duct 98. The spring 100, having a predetermined pressure when compressed to the length to which it is compressed when in use exerts a known pressure upon the valve to hold the same upon its seat. It is to be understood that the strength of the spring 100 will be determined by the pressure which is developed within the chamber 44. At the opposite side of the chambers 44 and 45 a similar connection is made wherein the ducts 101 and 102 are connected together adjacent their outer ends, the inner end of the duct 101 being connected to the chamber 45 through the valve seat upon which rests the valve 103. A suitable spring 104 is provided to place the valve 103 upon its seat in a manner similar to that described for the spring 100.

It will be observed from this structure that whenever the pressure in the chamber 44 is great enough to remove the valve 99 from its seat there will be a transfer of fluid from the chamber 44 around through the ducts 98 and 97 to the chamber 45. In the same way a pressure in the chamber 45 in excess of that necessary to force the valve 103 from its seat will cause the transfer of fluid from the chamber 45 through the ducts 101 and 102 to the chamber 44. This release of pressure of the liquid prevents the breaking of any of the parts and as soon as the resistance of the operation to the driven member is removed, the parts all return to their normal function.

While under normal conditions, the present device has been designed to hold its operating fluid without loss, occasionally through improper assembly or very long continuous use parts become out of order and oil leakage from the low pressure chamber 77 may occur. In order to supply replacement of oil for this loss which may occur, I have designed a reservoir which will not in any way affect the balance during rotation of the device as a whole. In order to carry out this idea in the structure herein described and shown, I have provided an integral flange 105 on the enclosing member 24. This integral flange has an overhanging ledge 106 having a purpose to be described. The flange member 37 extends beyond the periphery of the enclosing member 24 and is provided with an overhanging ledge 107. Between the extension of the flange member 37 and flange 105, I have provided a steel tube 108. This tube abuts against the flange 105 and is held in place by the extension of the flange member 37. It will be observed that this steel tube is spaced from the outer wall of the enclosing member 24. This space, between the tube 108 and the outer wall of the enclosing member 24, I have designated as 109.

The inner wall of the tube 108 and the outer wall of the enclosing member 24 is preferably smooth in order to make a tight joint with the ring piston formed of the cups 110 and the plates 111. The two cup members 110 are clamped as shown between the two plate members 111 to form the piston for the reservoir. In assembling the device the piston would be inserted and would be at the right as shown in Fig. 1. The right hand end of the piston chamber is connected with a duct 112 to the chamber 44 by way of the duct 90. A check valve 113 is provided to prevent the pressure of the duct 90 from reaching the interior of the fluid chamber which is at the right of the piston. A lug 114 having an opening 115 is provided in the flange 105 for the purpose of charging the reservoir. When this reservoir is charged, oil is first poured in to permit the escape of any air, after which the oil is forced in to place the piston to the left as shown in Fig. 1. This action compresses the air to the left of the piston and provides a resilient means for returning the piston to the right and supplying oil to the system in case there is leakage. Since the check valve 113 prevents the pressure of the chamber 44 from affecting the reservoir pressure, it will be clear that the oil in the reservoir will remain in the reservoir until such time as it may be needed. When needed, however, the check valve 113 will simply operate and permit the resilient air cushion at the left of the piston to operate to drive the fluid through the port 112 and into the fluid system and thereby keep the system full of oil at all times. A suitable plug 116 is provided to close the end of the filling duct 115.

It will thus be clear that I have provided a fluid control transmission means which will not have the disadvantages of the grinding of gears as in the present day transmissions most commonly used. Also my transmission instead of having a few gear ratios, has an infinite number of ratios, the change being made from one to another by the simple movement of a suitable lever or other operating member. It is likewise clear that the great objections to previous fluid transmissions which are characterized by complicated parts and inability to keep the fluid within the system have been removed in my invention.

In use, any suitable fluid such as oil of a proper consistency may be used. Attention is called to the fact that this device takes the place of both the clutch and the forward gear transmission. Further, it will be noted that my invention may be used with any suitable reverse mechanism to utilize the power of the engine, as distinguished from the friction of the engine as a brake in descending hills when my invention is applied to a motor vehicle. In so using my invention it is merely necessary to use the speed control in connection with the reverse and gradually increase the amount of power which the engine exerts on the fluid control mechanism. The engine would at first operate as a brake and would after a time stop the vehicle and then send the same in a rearward direction. The above described operation of the engine as a brake is brought about by the gradual restriction of the passage between the chambers 44 and 45 by a gradual restriction of the passage of the fluid therebetween. At the first part of the operation of the engine as a brake the weight and inertia of the vehicle in its descent would, of course, cause the forward rotation of the rotating member 21, after the reverse was applied and the enclosing member 24 was rotated in the opposite direction from the rotation of the rotating member 21. The first tendency, therefore, as the valve 48 was closed was for the enclosing member 24 to drive the rotating member 21, then going forward, in a reverse direction. This action at first brakes the movement of the car and further restriction of the passage of the fluid between the two chambers 44 and 45 will eventually cause stopping of the rotating member 21 and then its reverse movement.

While I have shown and described, in detail, an embodiment of my invention, it is to be understood that this showing is descriptive and merely illustrative and that I do not limit myself to the exact showing and that modifications and changes may be made without departing from the spirit of my invention and within the scope of the appended claims.

Having described my invention, what I claim and desire to secure by Letters Patent is:—

1. A power transmitting device comprising two coaxial rotating members, a power transmitting piston and cylinder having their axes extending in the same direction as the axes of the rotating members, a system of conduits for conducting the fluid including a connection between the ends of the cylinder and outward of its wall and means for retaining in the fluid system the fluid which leaks at the end of the cylinder.

2. A power transmitting device comprising two coaxial rotating members, a piston and cylinder having their axes extending in the same direction as the axes of the rotating members, a system of conduits for conducting the fluid including a connection between the ends of the cylinder and means for retaining in the fluid system the fluid which leaks at the end of the cylinder, said retaining means including a second connection between the cylinder ends.

3. A power transmitting device comprising two coaxial rotating members, a power transmitting piston and cylinder, a system of conduits for conducting the fluid including a connection between the ends of the cylinder and outward of its wall and means for collecting and returning to the cylinder, the fluid which leaks at the end of the cylinder.

4. A power transmitting device comprising two coaxial rotating members, a piston and cylinder, coacting means between the two rotating members, the piston and the cylinder, to cause the piston and cylinder to have relative axial movement, a controlled connection between the ends of the cylinder, means connected to the piston and having a surface adjacent and having movement relative to, a surface rigid with the cylinder, and means for delivering the fluid, which leaks between the surfaces, to the opposite end of the cylinder.

5. A power transmitting device comprising two coaxial rotating members, a power transmitting piston means and a coacting cylinder means, the piston rotating with one rotating member and the cylinder rotating with the other rotating member to control two variable chambers, means at the ends of the cylinder and piston means to receive the pressure created by the piston, a chamber provided outward of the pressure receiving means, to collect the fluid which leaks past said pressure receiving means.

6. A power transmitting device comprising two coaxial rotating members, a piston and cylinder, coacting means between the two rotating members, the piston and the cylinder, to cause the piston and cylinder to have relative axial movement, a controlled connection between the ends of the cylinder, means connected to the piston and having a surface adjacent and having movement relative to, a surface rigid with the cylinder, and means for delivering the fluid, which leaks between the surfaces, to the opposite end of the cylinder, said last named means including a check valve for preventing fluid movement in the opposite direction.

7. A power transmitting device comprising two coaxial rotating members, an enclosing member rotatable with one of the rotating members, an extension from one of the rotating members extending into the enclosing member, the enclosing and extending members, having surfaces closely associated with each other during relative rotation, fluid controlled means within the enclosing member including a piston and cylinder wall for coaction therewith to cause power transmission between the rotating members at varying speed ratios, and means for preventing the pressure of the fluid within the cylinder wall from reaching the adjacent surfaces of the enclosing and extending members.

8. A power transmitting device comprising two coaxial rotating members, a piston mounted on one of the members and a coacting fluid cylinder on the other, means at the end of the cylinder for receiving the high pressure created by the piston and a constantly relatively low pressure chamber outward of the pressure receiving means to collect the fluid which leaks past the pressure receiving means and a conduit for conducting the fluid back to the cylinder.

9. A power transmitting device comprising two coaxial rotating members, a piston mounted on one of the members and a coacting fluid cylinder on the other, means at the end of the cylinder for receiving the high pressure created by the piston and a relatively low pressure chamber outward of the pressure receiving means to collect the fluid which leaks past the pressure receiving means and a conduit for conducting the fluid back to the cylinder, the conduit being provided with a check valve to prevent movement of the fluid in an opposite direction.

10. A power transmitting device comprising two substantially coaxial rotating members, a piston mounted on one rotating member and a cylinder on the other, adjustable means for locking fluid between the cylinder walls and the piston to vary the speed ratio between the two rotating members, means surrounding the piston and a portion of the rotating member carrying the same, a packing revolving with one rotating member and relatively to and having contact with a surface carried by the other rotating member and means for preventing the pressure of the cylinder from reaching the packing.

11. A power transmitting device comprising two substantially coaxial rotating members, a piston mounted on one rotating member and a cylinder on the other, a pressure chamber at each side of the piston, a controlled fluid passage between the two pressure chambers, a pressure receiving wall at each outer end of the cylinder, each having a predetermined leak.

12. A power transmitting device comprising two substantially coaxial rotating members, a piston mounted on one rotating member and a cylinder on the other, a pressure chamber at each side of the piston, a controlled fluid passage between the two pressure chambers, a pressure receiving wall at each outer end of the cylinder, each having a predetermined leak and each having a leakage chamber to receive the leakage from the pressure chambers.

13. A power transmitting device comprising two substantially coaxial rotating members, a piston mounted on one rotating member and a cylinder on the other, a pressure chamber at each side of the piston, a controlled fluid passage between the two pressure chambers, a pressure receiving wall at each outer end of the cylinder, each having a predetermined leak, each having a leakage chamber and a conduit for conducting the leakage to the pressure chamber not under pressure.

14. A power transmitting device comprising two substantially coaxial rotating members, a piston mounted on one rotating member and a cylinder on the other, a pressure chamber at each side of the piston, a controlled fluid passage between the two pressure chambers, a pressure receiving wall at each outer end of the cylinder, each having a predetermined leak, each having a leakage chamber and a conduit for conducting the leakage to the pressure chamber, each conduit being provided with a check valve for preventing the passage of oil in the opposite direction.

15. A power transmitting device comprising two substantially coaxial rotating members, a cylinder mounted to rotate with one member and a piston mounted to rotate with the other and to move axially relative to the cylinder, two high pressure chambers and a low pressure chamber between them for receiving all the leakage and returning it to the system for reuse, an extension from the cylinder, a cam on the piston for cooperation with the extension, a rolling member in contact with the cam and surrounding the extension and anti-friction rolling devices between the rolling member and the extension.

16. A power transmitting device comprising two substantially coaxial rotating members, a cylinder mounted to rotate with one member and a piston mounted to rotate with the other and to move axially in the cylinder, a plurality of members extending from the rotating member carrying the piston and extending into openings in the end wall of the piston to cause the piston to rotate with the rotating member.

17. A power transmitting device comprising two substantially coaxial rotating members, a cylinder mounted to rotate with one member and a piston mounted about the other, that part of the rotating member upon which the piston is mounted, having a passage therethrough, ports connecting the passage with the cylinder chamber at each end of the piston and a valve within the rotating member upon which the piston is mounted, said valve controlling the passage of fluid between the chambers at each end of the piston.

18. A power transmitting device comprising two substantially coaxial rotating members, a cylinder mounted to rotate with one member and a piston mounted about the other, that part of the rotating member upon which the piston is mounted, having a passage therethrough, ports connecting the passage with the cylinder chamber at each end of the piston and a valve within the rotating member upon which the piston is mounted, said valve controlling the passage of fluid between the chambers at each end of the piston, the said valve being at the axial center of the rotating member.

19. A power transmitting device comprising two substantially coaxial rotating members, an enclosing member, having a cylinder therein, mounted on one of the rotating members, a piston in the cylinder and mounted on the other rotating member to rotate therewith and move axially in the cylinder, a valve, a controlled axially located fluid passage between the chambers of the cylinder at each end of the piston, and through the valve the rotating member carrying the piston having a thrust-journal bearing means on each side of the piston and in the enclosing member and a coacting means between the cylinder and piston to cause the latter to reciprocate in the former.

20. A power transmitting device comprising two substantially coaxial rotating members, an enclosing member, having a cylinder therein, mounted on one of the rotating members, a piston in the cylinder and on the other rotating member to rotate therewith and move axially in the cylinder, a controlled axially located fluid passage between the chambers of the cylinder at each end of the piston and extending through a portion of one of the rotating members, the rotating member carrying the piston having a thrust-journal bearing means on each side of the piston and in the enclosing member and a coacting means between the cylinder and piston to cause the latter to reciprocate in the former.

21. A power transmitting device comprising two substantially coaxial rotating members, a piston mounted on one rotating member and a cylinder member on the other rotating member, the piston having axial movement in the cylinder member, means coacting between the piston and cylinder to cause relative axial movement, a wall carried by the piston carrying rotating member, rotating relatively to the cylinder member and receiving the pressure within the cylinder.

22. A power transmitting device comprising two substantially coaxial rotating members, a piston mounted on one rotating member and a cylinder member on the other rotating member, the piston having axial movement in the cylinder member, means coacting between the piston and cylinder to cause relative axial movement, a wall carried by the piston-carrying rotating member, rotating relatively to the cylinder member and receiving the pressure within the cylinder and being out of contact with the cylinder member.

23. A power transmitting device comprising two substantially coaxial rotating members, a piston mounted on one rotating member and a cylinder member on the other rotating member, the piston having axial movement in the cylinder member, means coacting between the piston and cylinder to cause relative axial movement, walls carried by the piston-carrying rotating member at each side of the piston and rotating relatively to the cylinder member and receiving the pressure within the cylinder and being out of contact with the cylinder member.

24. A power transmitting device comprising two substantially coaxial rotating members, a piston mounted on one rotating member and a cylinder member on the other rotating member, the piston having axial movement in the cylinder member, means coacting between the piston and cylinder to cause relative axial movement, walls carried by the piston-carrying rotating member at each side of the piston and rotating relatively to the cylinder member and receiving the pressure within the cylinder and being out of contact with the cylinder member and bearing members for holding one of the rotating members and its walls, during relative rotation, in position away from contact with the cylinder member.

25. A power transmitting device comprising two substantially coaxial rotating members, a piston and cylinder mounted to rotate with the respective rotating members, a controlled fluid passage between the ends of the cylinder on opposite sides of the piston, means for causing axial reciprocation of the piston when the rotating members have relative rotary movement a valve axially located within one of the rotating members for controlling the passage of the fluid and yielding means for holding the valve in place and means for moving the valve while power is being transmitted.

26. A power transmitting device comprising two substantially coaxial rotating members, fluid controlled means connecting the rotating members for causing variable speed ratios between the rotating members, said means comprising a piston and a cylinder therefor having a chamber at each end, a conduit for passage of fluid from one side of the piston to the other and a second conduit for the passage of the fluid in the opposite direction and spring controlled means in each conduit for releasing to permit the passage of fluid when the pressure thereof is increased to a predetermined point.

27. A power transmitting device comprising two substantially coaxial rotating members, a fluid controlled means for causing variable speed ratios between the two rotating members, a reservoir for automatically supplying additional fluid as needed and a low pressure fluid chamber to catch all fluid leakage between power transmitting members and return the same to the system.

28. A power transmitting device comprising two substantially coaxial rotating members, a fluid controlled means for causing variable speed ratios between the two rotating members, a reservoir for automatically supplying additional fluid as needed, a low pressure conduit for conducting the fluid between two chambers of the fluid controlled means and means for preventing the passage of the fluid in a reverse direction.

29. A power transmitting device comprising two substantially coaxial rotating members, a fluid controlled means for causing variable speed ratios between the two rotating members, a reservoir for automatically supplying additional fluid as needed, a low pressure conduit for conducting the fluid to the fluid controlled means and a resilient means for holding the fluid in the reservoir in readiness to enter the fluid controlled means when necessary.

30. A power transmitting device comprising two rotating members, an enclosing member, fluid controlled devices within the enclosing member and connecting the rotating members for causing rotation of one of the rotating members at variable speed ratios to the rotation of the other, a reservoir surrounding the enclosing member, a low pressure conduit from the reservoir to the fluid controlled devices to supply additional fluid as needed.

31. A power transmitting device comprising two rotating members, an enclosing member, fluid controlled devices within the enclosing member for causing rotation of one of the rotating members at variable speed ratios to the rotation of the other, said fluid controlled devices including a piston and a cylinder having a chamber at each end of the piston, a reservoir surrounding the enclosing member, a conduit from the reservoir and leading to each chamber for delivering fluid thereto and means for preventing the passage of the fluid from the chambers to the reservoir.

32. A power transmission device comprising relatively reciprocable means and relatively rotatable means, a fluid system comprising high pressure and low pressure portions, the high pressure portion comprising a plurality of variable capacity fluid pressure chambers, each chamber having a controllable fluid outlet and a predetermined fixed fluid outlet, the fixed outlet discharging into the low pressure portion of the fluid system and means for conducting an amount of fluid to the high pressure portion of the system equal to the amount of the discharge.

33. A power transmission device comprising a low-pressure chamber relatively reciprocable means, the reciprocable means having variable capacity fluid pressure chambers therebetween, the chambers each having a controllable fluid outlet and a predetermined fixed fluid outlet, the fixed outlet discharging into the low pressure chamber and means for conducting an amount of fluid back to one of the chambers equal to the amount of the discharge.

34. A power transmitting device comprising relatively rotatable means, a fluid system comprising low pressure and high pressure portions, the high pressure portions comprising a plurality of variable capacity fluid pressure chambers, each chamber having a controllable fluid outlet and a predetermined fixed fluid outlet, the predetermined fixed outlet discharging into the low pressure portion of the fluid system and means for conducting an amount of fluid to the high pressure portion of the system equal to the amount of the discharge.

35. A power transmission device comprising relatively reciprocable means and relatively rotatable means, a fluid system comprising low pressure and high pressure portions, the high pressure portion comprising a plurality of variable capacity fluid pressure chambers, the combined capacity of the chambers remaining constant, each chamber having a controllable fluid outlet and a predetermined fixed fluid outlet, the predetermined fixed outlet discharging into the low pressure portion of the fluid system and means for conducting an amount of fluid to the high pressure portion of the system equal to the amount of the discharge.

36. A power transmitting device comprising two co-axial rotating members, a piston movable with one of the members, and a co-acting fluid cylinder movable with the other comprising a chamber in which high pressure is created by the piston, and a constantly relatively low pressure chamber exterior to the cylinder chamber to collect the fluid which leaks from the high pressure chamber, and a conduit for conducting the fluid back to the cylinder.

37. A power transmitting device comprising two substantially co-axial rotating members; a reciprocatory pumping device comprising a chamber element having two pressure chambers, the chambered element being carried by one, a piston element carried by the other of the rotating members and cooperating with the chambered element, a controlled fluid passage between the two pressure chambers, the pressure chambers having each a predetermined leak in the pressure stroke.

38. A power transmitting device comprising two substantially co-axial rotating members, a reciprocatory pressure producing device comprising two pressure chambers and co-operating piston means, the chambered element being controlled in its movement by one, and the piston element by the other rotating member, a controlled fluid passage between the two pressure chambers, each pressure chamber having a fixed predetermined leak, and a chamber appurtenant to each pressure chamber to receive the leak of the pressure chamber.

39. A power transmitting device comprising two substantially co-axial rotating members, a reciprocatory pressure producing device comprising two pressure chambers and co-operating piston means, the chambered element being controlled in its movement by one, and the piston element by the other rotating member, a controlled fluid passage between the two pressure chambers, each pressure chamber having a fixed predetermined leak, a chamber appurtenant to each pressure chamber, and a conduit for conducting the leak to the pressure chamber not under pressure.

40. A power transmitting device comprising two substantially co-axial rotating members, a reciprocatory pressure producing device comprising two pressure chambers and co-operating piston means, the chambered element being controlled in its movement by one, and the piston element by the other rotating member, a controlled fluid passage between the two pressure chambers, each pressure chamber having a predetermined leak, a chamber appurtenant to each pressure chamber, and a conduit for conducting the leakage to the pressure chamber not under pressure, each conduit being provided with a check valve for preventing passage of fluid in the opposite direction.

41. In an apparatus for the purpose indicated, a supporting structure; rotary driving and driven power members carried by said structure; two parts carried by said power members respectively arranged to co-operate for relative movement of a predetermined character, said parts constituting a pressure chamber structure having pressure chambers and also constituting operating connections between the two power members for rotation of one of said members by the other; said relatively moving parts including members slidably related for relative movement to relatively vary the fluid chamber capacity of the pressure chambers of the chamber structure which they constitute; a fluid flow conduit connecting pressure chambers oppositely related in respect to pressure change; means for regulating the fluid flow capacity of said conduit; a chamber separate from said pressure chamber structure, but in position to receive leakage from the pressure chambers, means independent of leakage places for fluid communication between the pressure space of the pressure chamber structure and said separate chamber, and means controlling said communication adapted to permit fluid flow freely from the separate chamber into said pressure space and to stop flow in the reverse direction.

42. In an apparatus for the purpose indicated, a supporting structure; rotary driving and driven power members carried by said structure; two parts carried by said power members respectively arranged to co-operate for relative movement of a predetermined character, said parts constituting a pressure chamber structure having pressure chambers and also constituting operating connections between the two power members for rotation of one of said members by the other; said parts constituting a cylinder-and-piston unit having pressure chambers in which the pressure is alternately increased and diminished by the opposite strokes; a fluid flow conduit connecting pressure chambers oppositely related in respect to pressure change; means for governing the fluid flow capacity of said conduit; a chamber separate from said pressure chamber structure, but in position to receive leakage from the pressure chambers, means independent of leakage for fluid communication between the pressure space of the pressure chamber structure and said separate chamber, and means controlling said communication adapted to permit fluid flow freely from the separate chamber into said pressure space and to stop flow in the reverse direction.

43. In an apparatus for the purpose indicated, a supporting structure; rotary driving and driven power members carried by said structure including a pressure chamber element, and a piston element; a reciprocatory pumping unit of which the pressure chamber element is carried by one, and the piston element by the other of the rotary power members, said structure containing a fluid flow conduit connecting chambers in which high pressure is produced in different parts of the pumping cycle; means for governing the fluid flow capacity of said conduit, a chamber separate from said pressure chamber structure and connected thereto in position to receive leakage from the pressure chambers, means independent of leakage for fluid flow between said separate chamber and the pressure chamber, and means controlling said connection adapted to permit fluid flow freely from the separate chamber into said pressure space and to stop flow in the reverse direction.

44. A power transmitting device comprising two rotating members, an enclosing member, fluid control devices within the enclosing member for causing rotation of one of the rotating members at variable speed ratios to the rotation of the other, said fluid controlled devices including a piston and cylinder pumping unit having a pressure chamber at each end; a reservoir surrounding the enclosing member, a conduit from the reservoir and leading to each chamber for delivering fluid thereto, and means for normally preventing the passage of the fluid from the chambers to the reservoir.

FREDERICK W. MURRAY.